United States Patent [19]

Mercier et al.

[11] Patent Number: 5,603,573
[45] Date of Patent: Feb. 18, 1997

[54] MULTI-USE BAG

[76] Inventors: Marie-Madeleine Mercier; Christian Ragonot, both of 29, rue Delabordère, 92200 Neuilly sur Seine, France

[21] Appl. No.: 533,285

[22] Filed: Sep. 25, 1995

[30] Foreign Application Priority Data

Sep. 23, 1994 [FR] France .................................. 94 11363

[51] Int. Cl.⁶ .................................................. B65D 30/06
[52] U.S. Cl. ........................ 383/117; 383/111; 383/121.1; 119/497
[58] Field of Search ................................. 383/13, 18, 41, 383/111, 117, 121.1; 150/103, 100, 105; 119/496, 497; 190/18 A

[56] References Cited

U.S. PATENT DOCUMENTS

| | | | |
|---|---|---|---|
| 1,251,404 | 12/1917 | Mills | 119/497 X |
| 2,170,379 | 8/1939 | Ortt | |
| 2,784,890 | 3/1957 | Chisholm | |
| 3,850,144 | 11/1974 | Springer et al. | |
| 4,112,991 | 9/1978 | Barbaresi | |
| 4,977,857 | 12/1990 | Slawinski | |
| 5,170,745 | 12/1992 | Burdette, Jr. | |
| 5,366,293 | 11/1994 | Lii | 383/117 X |
| 5,518,315 | 5/1996 | Nichols | 383/18 X |

FOREIGN PATENT DOCUMENTS

| | | | |
|---|---|---|---|
| 2354727 | 1/1978 | France | |
| 2525993 | 11/1983 | France | 383/18 |
| 439856 | 1/1927 | Germany | |
| 1913431 | 10/1970 | Germany | |

*Primary Examiner*—Jes F. Pascua
*Attorney, Agent, or Firm*—Young & Thompson

[57] ABSTRACT

Multi-use bag, particularly for the transport of a small animal. The bag according to the invention comprises a support (11) comprising three interconnected panels (14, 15) to form an assembly of U-shaped profile, open at two opposite ends, and a container (12) adapted to fit in the support, a tray being provided between the support and the container.

9 Claims, 2 Drawing Sheets

MULTI-USE BAG

The invention relates to a multi-use bag, which is to say comprising a base structure and accessories permitting transforming it so as to function according to the needs of the user and particularly to adapt it for the transportation of a pet, as for example a small cat or dog.

Totes or bags of large size are generally not very attractive. If such a bag is used to transport perishable foodstuffs or an animal (which is required to be able to use public transport), it is difficult to clean. The invention permits particularly solving these problems.

A first object of the invention is to provide a multi-use bag, both good looking and practical, easy to clean and adapted to transport a small animal.

A second object of the invention is to provide a bag which can be modified easily as a function of circumstances and/or the wishes of the user, so as to be carried in different ways.

More particularly, the invention relates to a multi-use bag comprising a support constituted by three panels: a base panel and two lateral panels, said panels being interconnected to form a U-shaped assembly, open at two ends and comprising moreover at least one container adapted to fit into said support, characterized in that said container comprises at least an open work bottom and in that a tray is provided to be interposed between said bottom panel of said support and the openwork bottom of said container.

According to another possibility, the bag can be completed by a removable wheeled base.

The invention will be better understood and other advantages of the latter will become apparent more clearly from the description which follows of a presently preferred embodiment of the multi-use bag according to its principle, given solely by way of example with reference to the accompanying drawings, in which.

Figure 1:
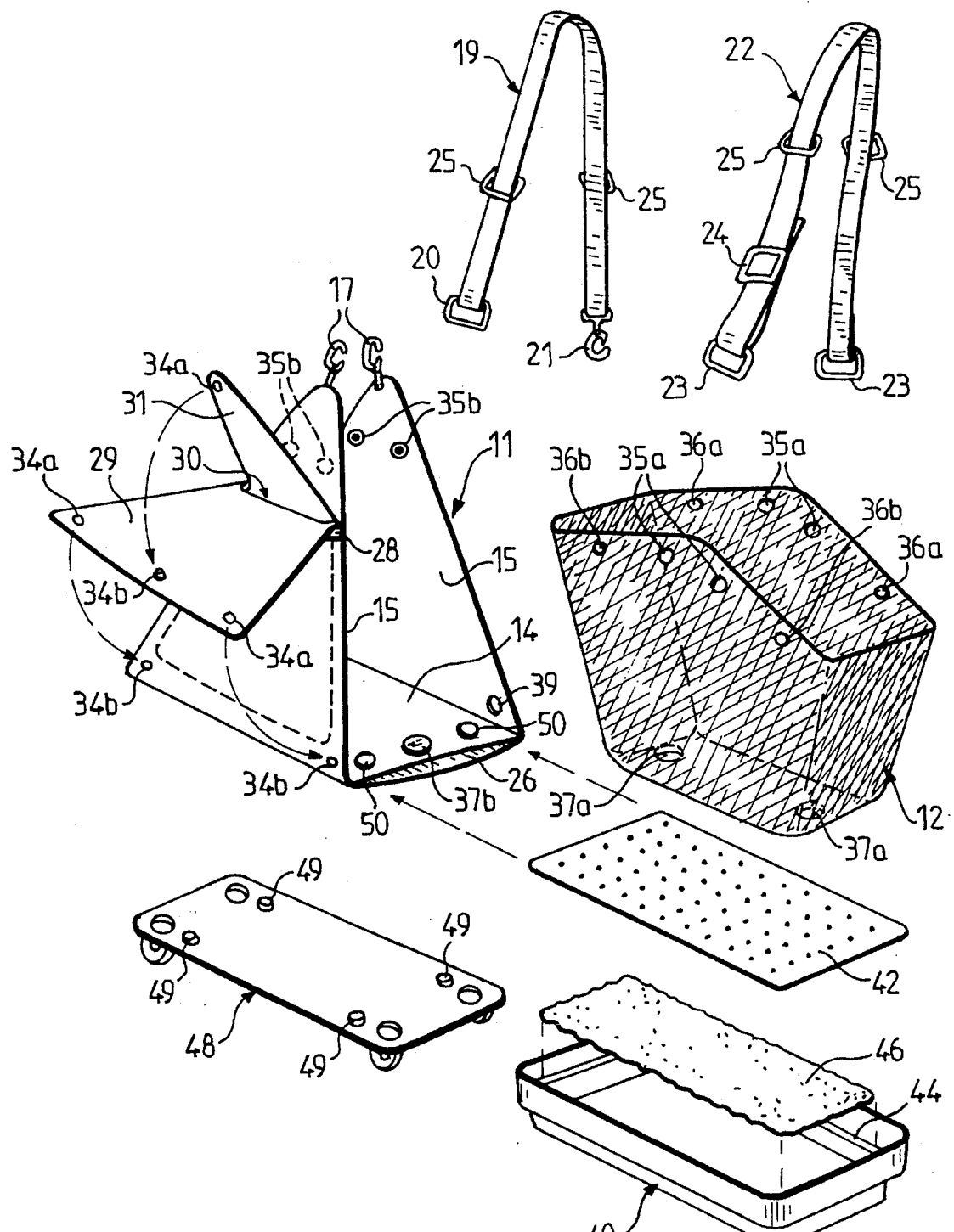
FIG. 1 is an exploded perspective view of a bag according to the invention, showing the constituent base elements of this bag as well as its principal accessories.

Referring more particularly to FIG. 1, there is shown a multiuse bag according to the principle of the invention defined above and comprising principally a support 11 forming an assembly of substantially U shape and open at two opposite ends, as well as a container 12 forming a sort of receptacle, open at its upper portion and fitting and adapted to be secured in said support. More particularly, the support 11 comprises three panels interconnected by flexible hinges, to form said substantially U-shaped assembly. There will be seen a bottom panel 14 and two lateral panels 15 interconnected along two longitudinal edges of said bottom panel. All of the support is preferably of a semi-rigid material, if desired with a leather or artificial leather trim or other suitable material. The container 12 is generally of a more flexible material than that which constitutes the support. It can for example be constructed from a sheet of openwork plastic material or net, somewhat rigid or even to be directly shaped in this manner by molding. It is especially desirable to produce the container 12, at least partially from netting, so as to transport an animal, because this latter can see the outside and breathe better. In the illustrated example, the two lateral panels 15 are substantially triangular and connected by their respective bases to the two longitudinal edges of the bottom panel 14. The summit of each lateral panel 15 is provided with a hook 17 of the snap hook type or any other analogous attachment means. At least one strap is provided to be connected to the hooks 17. There is shown here a strap 19 provided with a buckle 20 at one end and a hook 21 of the snap hook type at its other end. It also comprises two intermediate buckles 25 permitting, when they are used, limiting the useful length of the strap. The bag preferably comprises two straps of this type. It can also comprise at least one strap 22 provided with a buckle 23 at each end. This strap is of an adjustable length thanks to an intermediate buckle 24. Other straps or belts variously constituted, particularly of different lengths, can be used.

The bottom panel 14 comprises a double wall providing a gusset 26 into which can be slid a rectangular rigidifying plate, particularly when the bag is used as a grocery bag or to transport heavy and/or fragile objects. In this way, there is given to the bag a certain shape and a certain internal volume and to a certain extent crushing of its contents is avoided.

One of the lateral panels 15 comprises several superposed pockets. There can be distinguished a pocket 28 for certain accessories, particularly unused straps, closed by a trapezoidal flap 29 itself forming a pocket 30 adapted to contain documents. The flap 29 is itself covered with a triangular flap 31 which in the illustrated embodiment protects access to the pocket 30. The flap 31 is secured in the same manner to the panel 18. The flaps 29 and 31 and the panel 15 are provided with coacting assembly devices (of any known type) such as for example male and female snaps 34a, 34b. Of course, the materials constituting the support 15, the flaps 29, 31 and the container 12 can be different and their colors can be varied to give a particular or luxurious appearance to the bag.

The container 12 and the two lateral panels 15 comprise also at their respective upper portions coacting assembly devices, for example again male and female snaps 35a, 35b. Other snaps 36a, 36b, or the like are provided adjacent the edges of the container to close the latter. The bottom of the container 12 and the bottom panel 14 of the support 11 are also provided with coacting assembly devices 37a, 37b. One of the lateral panels 15, preferably the one which does not carry the pockets and flaps described above, comprises two attachment means 39, constituted for example by simple perforations reinforced by metallic rings, disposed adjacent the ends of its base, as shown. They serve for the connection of the straps or belts in certain configurations of the bag, as will be seen hereinafter.

Figure 2:
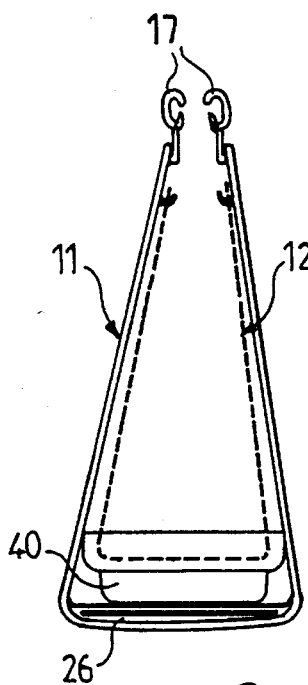
FIG. 2 is a schematic cross-sectional view of the bag showing the insertion of certain accessories when it is desired to carry an animal.
Figure 3:
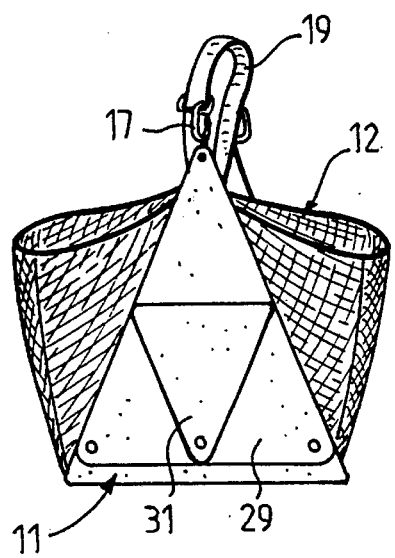
FIGS. 3 to 6 are schematic views showing various possible configurations of the bag.

According to another interesting characteristic of the invention, the container 12 comprises at least one openwork bottom, which is the case here because it is entirely constituted of netting and there is moreover provided a flat tray 40, surmounted by a perforated plate 42 or the like, of a shape and size corresponding substantially to those of the bottom panel 14 of said support. As will be seen in FIG. 2, this tray 40 is interposed between the bottom panel 14 of the support and the openwork bottom of the container 12, this latter coming to rest on the perforated plate. Securement means (not shown) are preferably provided between the lower wall of the tray 40 and the panel 14. Moreover, said tray 40 comprises a peripheral internal shoulder 44, on which rests the perforated plate 42. A block of absorbent material 46 is disposed in the bottom of the tray beneath the perforated plate. This block can be impregnated with a deodorizing product.

In this arrangement, the bag is well adapted for carrying a small-size animal, such as a dog or a cat. The excrement is recovered in the tray, particularly the urine being absorbed by the block 46.

Finally, it is to be noted that the tray can be completed by a rollered base 48, which is rigid, removable, adapted to be fitted below the bottom panel 14 of the support 11. For its securement, the rigid plate of the base can be provided with holes 49 and the bottom panel 14 can also comprise corresponding holes 50. The securement is then effected by screws or like elements. The securement can also be effected by cloth elements with coacting hooks and loops. Particularly, the securement means between the plate and the support can be different and cloth elements with coacting hooks and loops can be provided respectively on the base and the support. The perforated plate 42 can constitute the rigidification plate adapted to be engaged in the gusset 26, when the tray 40 is not installed in the bag. This bag as well as the container 12 are preferably of easily washable plastic material. The cleaning of the support 11 poses no problem because the latter can be flattened.

Figure 4:
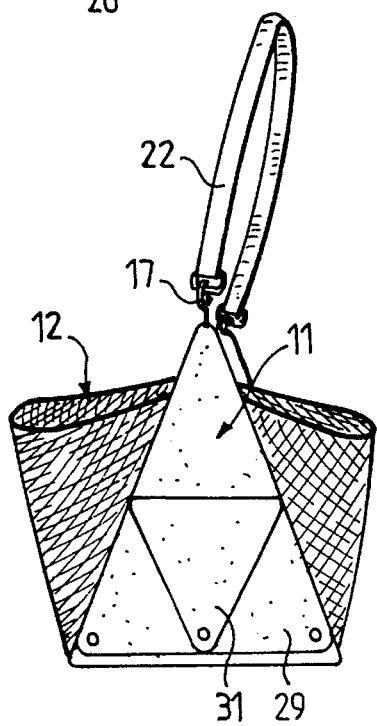
Figure 5:
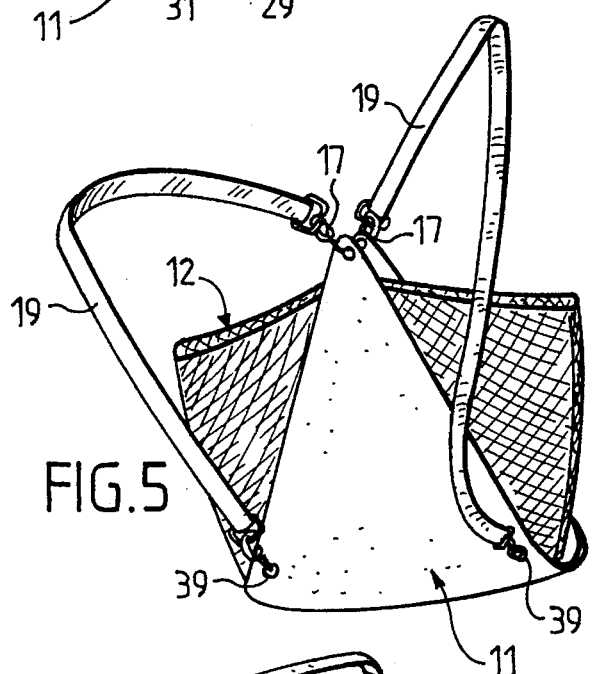
Figure 6:
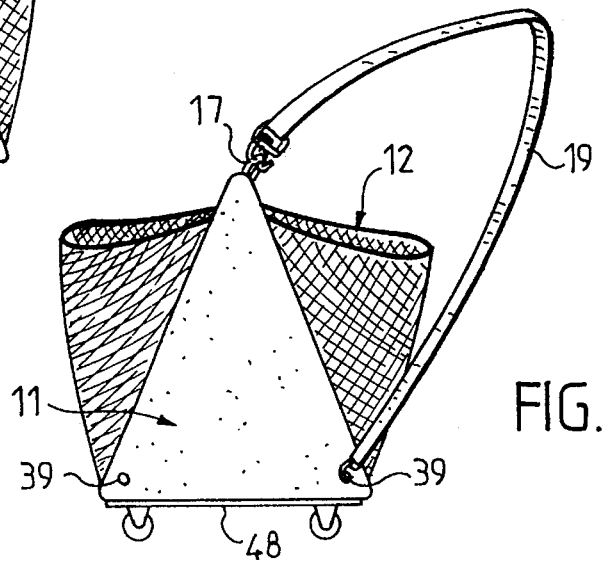

FIGS. 3 to 6 show different configurations possible for the bag, permitting carrying it in different manners. Thus, in FIG. 3, the strap 19 is shortened as much as possible (one could also use a shorter strap) and its two buckles 25 are hooked to the snap hooks 17. The bag can be carried as a handbag. In the configuration of FIG. 4, the strap 22 is used and the bag can be carried as a shoulder bag. In the arrangement of FIG. 5, there are used two straps 19 each installed between a snap hook 17 and one of the attachment means 39. In this case, the bag becomes a backpack or chest pack. In the arrangement of FIG. 6, the rolling base 48 is installed beneath the lower panel 14 and one of the straps 19 is used to pull it along the ground like a carriage.

I claim:

1. In a multi-use bag comprising a support (11) constituted by three panels: a bottom panel (14) and two lateral panels (15), said panels being interconnected to form an assembly of substantially U shape, open at two ends and moreover comprising at least one container (12) adapted to fit in said support; the improvement wherein said container (12) comprises at least one openwork bottom, and a tray (40) interposed between said bottom panel (14) of said support and said openwork bottom.

2. Multi-use bag according to claim 1, wherein said container (12) is comprised at least in part of netting.

3. Multi-use bag according to claim 1, wherein said tray (40) comprises a peripheral shoulder (44) on which rests a perforated plate (42).

4. Multi-use bag according to claim 3, further comprising a block of absorbent material (46) disposed at the bottom of said tray, beneath said perforated plate (42).

5. Multi-use bag according to claim 1, wherein said bottom panel (14) is arranged as a gusset (26) and in that a rigidification plate is adapted to be slid within this gusset.

6. Multi-use bag, according to claim 1, which further comprises a removable rollered base (48).

7. Multi-use bag according to claim 1, wherein said lateral panels (15) are substantially triangular.

8. Multi-use bag according to claim 7, which further comprises attachment means (17) at an upper end of each lateral panel (15).

9. Multi-use bag according to claim 8, wherein one of the lateral panels comprises two attachment means (39) adjacent the ends of its base.

* * * * *